Nov. 2, 1926.

J. H. TAYLOR 1,605,482

MANHOLE PAD AND METHOD OF MAKING THE SAME

Filed May 13, 1925

INVENTOR
James Hall Taylor.
BY Charles H. ... Attys

Patented Nov. 2, 1926.

1,605,482

UNITED STATES PATENT OFFICE.

JAMES HALL TAYLOR, OF OAK PARK, ILLINOIS.

MANHOLE PAD AND METHOD OF MAKING THE SAME.

Application filed May 13, 1925. Serial No. 29,867.

This invention relates to a manhole pad, a shell structure such as conduits, pipes, tanks or boilers and the method of making the same.

In large shell structures of this type for certain purposes, it is frequently necessary to provide manholes. Usually an appropriate aperture is formed in the shell structure and the pad with a suitable aperture is welded or secured around the margin of the aperture in the shell structure. In the past, these pads have been formed from a metal block which requires a great deal of machining and fitting. This method is slow, tedious and expensive.

It is an object of this invention to overcome this objection in the provision of a pad which is formed from a suitable cylindrical member in a novel way that is far less expensive as to time and labor and which can be incorporated into the shell structure or attached thereto more expeditiously and with minimum time and labor and which will not distort the structure.

The invention comprises the novel structure and method hereinafter described and more particularly pointed out and defined in the appended claims.

In the accompanying drawings which illustrate a preferred embodiment of this invention and in which similar reference numerals refer to similar features in the different views.

Figure 1:
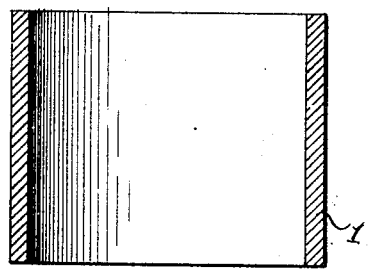
Figure 1 is a sectional view through a cylinder from which the pipe pad is made.
Figure 2:
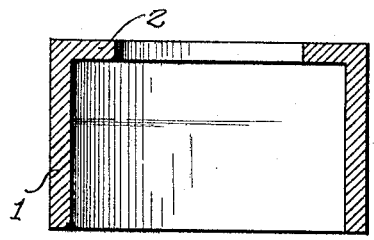
Figure 2 is a sectional view through the same cylinder after the first step in the method has been performed.
Figure 3:
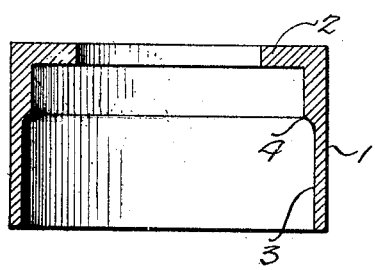
Figure 3 is a sectional view through the cylinder after the second step of the method has been performed.
Figure 4:
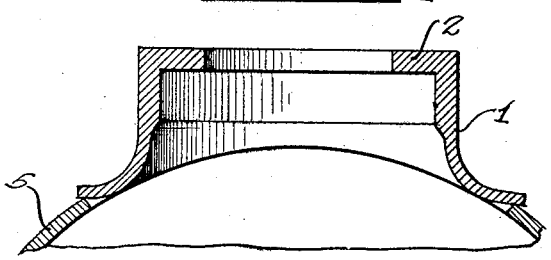
Figure 4 is a sectional view of the completed pipe pad positioned upon a shell structure ready for welding thereto.
Figure 6:
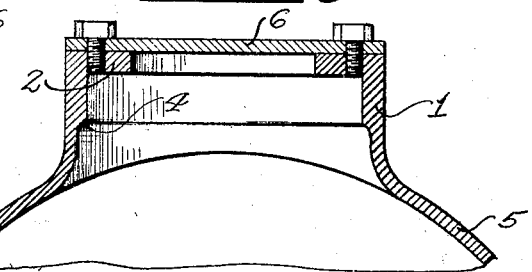
Figure 6 is a fragmentary sectional view of the pad riveted to an apertured shell structure.
Figure 5:
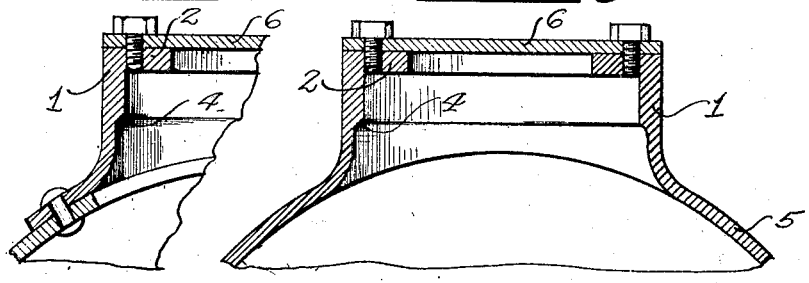
Figure 5 is a sectional view of the pipe pad welded to a pipe.

In carrying out this invention, I construct or procure a cylinder 1 of proper size, as shown in Figure 1, and inwardly flange the upper end as shown at 2 in Figure 2 to provide a seat for a manhole cover. I then materially reduce the lower portion of the wall of the cylinder by machining, forging or drawing to bring the same to a suitable thickness for welding or attachment to a shell structure. In the present instance, the reduction, as shown at 3 in Figure 3, is effected by machining the interior of the cylinder from a suitable point 4 below the flange 2 to the bottom edge of the cylinder. I then fashion the lower reduced portion of the cylinder, as shown in Figures 4 and 6, so that the same may be seated upon the margin of the aperture in the shell structure to which it is to be attached. It may be attached to such structure by welding, as shown in Figure 5, or by riveting or bolting, as shown in Figure 6.

If necessary, I machine the upper surface of the flange 2 to provide an even surface for the cover 6 which is bolted or secured to the flange 2.

It will be appreciated that the reduction of the lower wall portion of the cylinder 1 allows the same to be readily fashioned in an outwardly flaring manner for attachment purposes. It will also be appreciated that the reduction expedites the welding process in case the same is used.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. The method of making a manhole pad which consists of forming a cylinder, inwardly flanging the upper margin thereof, interiorly reducing the lower wall portion and flaring such reduced portion outwardly.

2. The method of making a pipe pad which consists in inwardly flanging the upper margin of a cylinder, reducing the lower portion of the wall thereof and outwardly flaring such reduced portion.

3. The method of making a pipe pad which consists of inwardly flanging the upper margin of a cylinder, interiorly reducing the lower wall portion thereof and outwardly flaring such reduced portion.

4. A manhole pad for a shell structure comprising a cylindrical structure having an upper, inwardly directed marginal flange, and a lower materally reduced wall portion, said reduced wall portion being outwardly flared.

5. A manhole pad for a shell structure comprising a cylindrical member having an upper inwardly directed annular flange and a lower interiorly and materially reduced wall portion, said lower portion being outwardly flared for the purpose set forth, and a cover removably secured to said annular flange.

6. A manhole pad for a shell structure comprising a cylindrical member having an upper inwardly directed flange and a lower materially reduced wall portion, the margin of said reduced wall portion being flared outwardly and the metal between said flange and reduced portion being of the same thickness as the flange.

7. A pipe pad comprising a cylindrical member having an upper inwardly directed annular flange and a lower interiorly reduced portion corresponding substantially to the thickness of the pipe, said lower portion being outwardly curved.

In testimony whereof I have hereunto subscribed my name.

JAMES HALL TAYLOR.